United States Patent
Cui (10) Patent No.: US 12,481,266 B2
(45) Date of Patent: Nov. 25, 2025

(54) NUMERICAL CONTROL DEVICE HAVING FUNCTION OF CHANGING SET PARAMETER FOR CONTROLLING CONTROL OBJECT AT CERTAIN TIMING, AND METHOD FOR CHANGING SET PARAMETER THEREFOR

(71) Applicant: Fanuc Corporation, Yamanashi (JP)

(72) Inventor: Hang Cui, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 494 days.

(21) Appl. No.: 18/017,930

(22) PCT Filed: Jul. 27, 2021

(86) PCT No.: PCT/JP2021/027715
§ 371 (c)(1),
(2) Date: Jan. 25, 2023

(87) PCT Pub. No.: WO2022/025049
PCT Pub. Date: Feb. 3, 2022

(65) Prior Publication Data
US 2023/0288904 A1    Sep. 14, 2023

(30) Foreign Application Priority Data

Jul. 29, 2020  (JP) ................................ 2020-128047

(51) Int. Cl.
*G05B 19/409*  (2006.01)
(52) U.S. Cl.
CPC ................. *G05B 19/409* (2013.01)
(58) Field of Classification Search
CPC ........ G05B 19/409; G05B 2219/35398; G05B 2219/35513; G05B 19/18
See application file for complete search history.

(56) References Cited

U.S. PATENT DOCUMENTS

2011/0015771 A1   1/2011   Guo et al.
2018/0011474 A1   1/2018   Brinkhaus
(Continued)

FOREIGN PATENT DOCUMENTS

CN   203084505 U   7/2013
CN   106020129 A   10/2016
(Continued)

OTHER PUBLICATIONS

International Search Report and Written Opinion for International Application No. PCT/JP2021/027715, dated Oct. 26, 2021, 6 pages.
(Continued)

*Primary Examiner* — Mohammad Ali
*Assistant Examiner* — Sheela Rao
(74) *Attorney, Agent, or Firm* — Buchanan Ingersoll & Rooney PC (57) ABSTRACT

A numerical control device having a function of changing a set parameter for controlling a control object at a certain timing includes a main control unit for outputting various commands, a memory for storing various data including the set parameter, a parameter input part for inputting a changed set parameter, and a parameter change command part for outputting an update command, wherein the parameter change command part includes a determination data selecting section for selecting determination data for determining a timing of change in accordance with a set parameter, a data acquiring section for acquiring a detection value of the determination data in a real-time manner, and a determining section for creating an update command on the basis of an acquired detection value.

8 Claims, 9 Drawing Sheets

(56) References Cited

U.S. PATENT DOCUMENTS

| | | | |
|---|---|---|---|
| 2019/0361467 A1 | | 11/2019 | Fujita et al. |
| 2020/0103849 A1 | | 4/2020 | Cui |
| 2020/0159191 A1 | * | 5/2020 | Takeuchi ............. G05B 19/416 |
| 2020/0201527 A1 | | 6/2020 | Nakajima et al. |

FOREIGN PATENT DOCUMENTS

| | | | | |
|---|---|---|---|---|
| CN | 107209496 A | | 9/2017 | |
| CN | 108723582 A | | 11/2018 | |
| CN | 109257940 A | | 1/2019 | |
| CN | 110968043 A | | 4/2020 | |
| CN | 111052018 A | | 4/2020 | |
| JP | 07129218 A | | 5/1995 | |
| JP | 08263118 A | | 10/1996 | |
| JP | H09212226 A | * | 8/1997 | ........... G05B 19/408 |
| JP | 2002-091521 A | | 3/2002 | |
| JP | 2020052859 A | | 4/2020 | |
| WO | 2017/145912 A1 | | 8/2017 | |

OTHER PUBLICATIONS

Office Action (The First Office Action) issued Mar. 7, 2025, by the State Intellectual Property Office of People's Republic of China in corresponding Chinese Patent Application No. 202180058896.7 and an English translation of the Office Action. (17 pages).

Notice of Allowance (Notification to Grant a Patent) issued Jun. 18, 2025, by the National Intellectual Property Administration, P. R. China in corresponding Chinese Patent Application No. 202180058896.7 and an English translation of the Notice of Allowance. (5 pages).

* cited by examiner

NUMERICAL CONTROL DEVICE HAVING FUNCTION OF CHANGING SET PARAMETER FOR CONTROLLING CONTROL OBJECT AT CERTAIN TIMING, AND METHOD FOR CHANGING SET PARAMETER THEREFOR

CROSS REFERENCE TO RELATED APPLICATIONS

This is the U.S. National Phase application of PCT/JP2021/027715, filed Jul. 27, 2021, which claims priority to Japanese Patent Application No. 2020-128047, filed Jul. 29, 2020, the disclosures of each of these applications being incorporated herein by reference in their entireties for all purposes.

FIELD OF THE INVENTION

The present invention relates to a control device having a function of changing a set parameter, and a method for changing the set parameter for the control device.

BACKGROUND OF THE INVENTION

In a control device for controlling a control object by issuing a control command based on various set parameters, such as position and processing conditions, to the control object, such as industrial machine, there is a necessity to change the set parameters when, for example, an environment for using the control object is changed, or a type of a workpiece to be processed or a type of process is changed. In such a control device, when the set parameters are changed suddenly during a normal control operation, the movements of a drive mechanism, such as motor, and transport mechanism is changed. That causes a problem that a large load is placed on the structure of the control object, or a defect occurs in a processed workpiece, by way of example.

As an example of such control device, Patent Literature 1 discloses a control system for a machine tool which is automated by reflecting parameters by computer numerical control, comprising storing means that, when the parameter is changed, stores the parameter thus changed as a changed parameter, changed parameter reflecting condition setting means that sets a condition for reflecting the changed parameter, and changed parameter reflecting means that, when the condition is detected, reflects a changed parameter not yet reflected. Thus, it is possible to reflect the changed parameter to a machine side at an arbitrary timing according to a worker's intention, and it is also possible to prevent the changed parameter from affecting the machine side regardless of the worker's intention.

PATENT LITERATURE

[Patent Literature 1] Japanese Patent Laid-Open Publication No. 2020-52859

SUMMARY OF THE INVENTION

In the above-mentioned regard, in order to avoid causing unintended control, change in a set parameter of a control object is not usually performed during a control operation but is performed after the completion of a series of control operations, during waiting the control operation or so. For example, as the conditions for reflecting the changed parameter to the machine side, the control system for the machine tool disclosed in Patent Literature 1 also includes normal re-turning on of power supply of the machine tool according to the worker's intention, executing a reset operation for resetting the parameter by the worker, and executing a pressing-down operation of a specific button for each changed parameter by the worker.

In such a conventional operation of changing a set parameter, the timing of changing the set parameter is actually limited to when a control object (e.g., machine tool) is not operated or driven. Thus, even if there was a risk of causing damage to a device or a workpiece by continuing the control during the control operation, the set parameter could be changed only after the series of control operations had been executed.

For these reasons, there is a need for a numerical control device that enables changing of the set parameter at a predetermined timing and a method for changing the set parameter therefor.

One aspect of the present invention is a numerical control device having a function of changing a set parameter for controlling a control object at a predetermined timing includes a main control unit that outputs various commands for the control object, a memory that stores various data including a set parameter, a parameter input unit that inputs a changed set parameter that is changed by overwriting the set parameter stored in the memory, and a parameter change command unit that outputs an update command for changing the set parameter into a changed set parameter, in which the parameter change command unit includes a determination data selecting section that selects determination data for determining the predetermined timing based on the set parameter, a data acquiring section that acquires a detection value of the selected determination data, and a determining section that creates an update command based on the detection value acquired by the data acquiring section.

One aspect of the present invention is a method for changing a set parameter for a numerical control device that changes a set parameter for controlling a control object at a predetermined timing, and when various commands for the control object are output, the method performs a step of inputting a changed set parameter that is changed by overwriting a set parameter stored in a memory for storing various data including the set parameter, and a step of outputting an update command for changing the set parameter into a changed set parameter, in which the step of outputting the update command includes a step of selecting determination data for determining the predetermined timing based on the set parameter, a step of acquiring a detection value of the selected determination data in real time, and a step of creating an update command based on the acquired detection value.

According to one aspect of the invention, when an update command for changing a set parameter into a changed set parameter is output, determination data for determining a timing for changing the set parameter according to the parameter is selected, then a detection value of the selected determination data is acquired in real time, and an update command is created based on the acquired detection value, and thereby the set parameter can be changed at a predetermined timing even during a control operation. As a result, time taken for changing the set parameter can be reduced.

DETAILED DESCRIPTION OF EMBODIMENTS OF THE INVENTION

A description will now be made about embodiments of a numerical control device having a function of changing a set parameter for controlling a control object at a predetermined timing and a method for changing the set parameter therefor according to a representative example of the present invention by referring to the accompanying drawings.

First Embodiment

Figure 1:
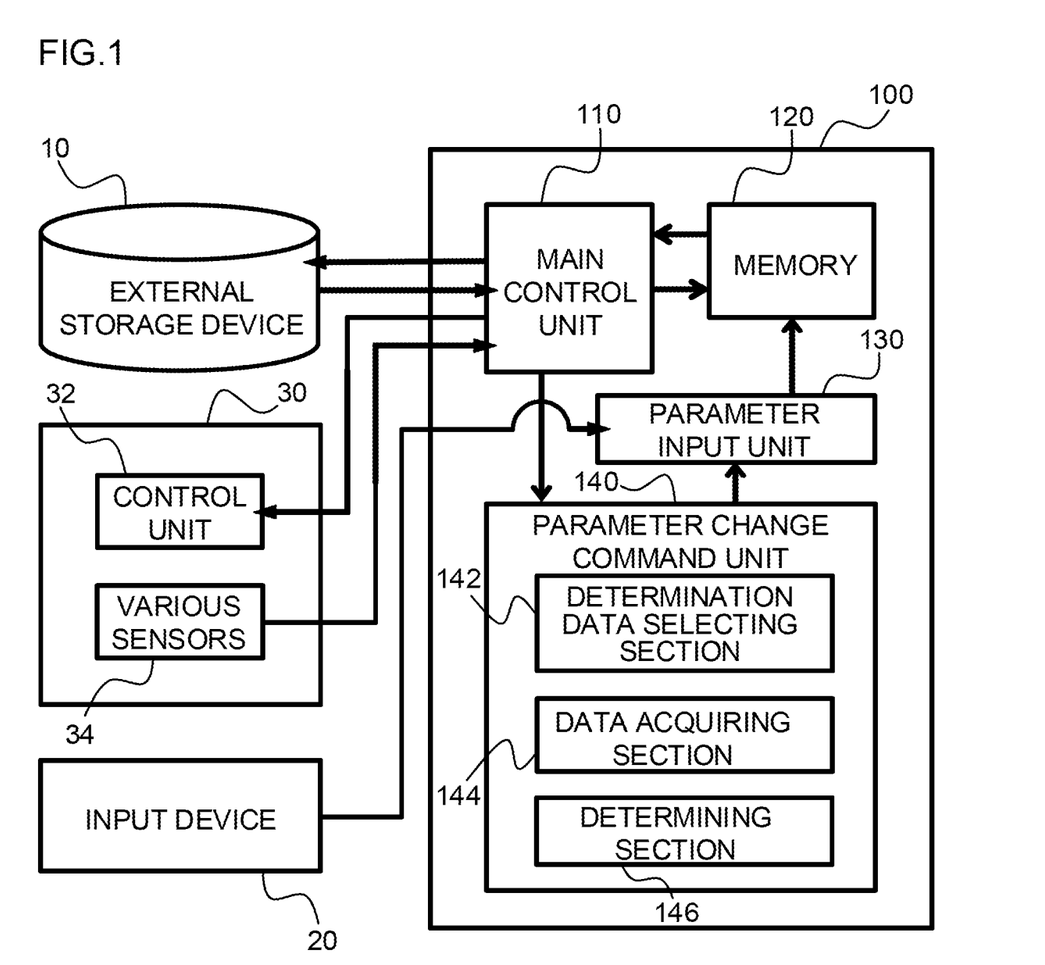
FIG. 1 is a block diagram showing a relation between a numerical control device having a function of changing a set parameter for controlling a control object at a predetermined timing and its peripheral devices according to a first embodiment of the present invention.
Figure 2:
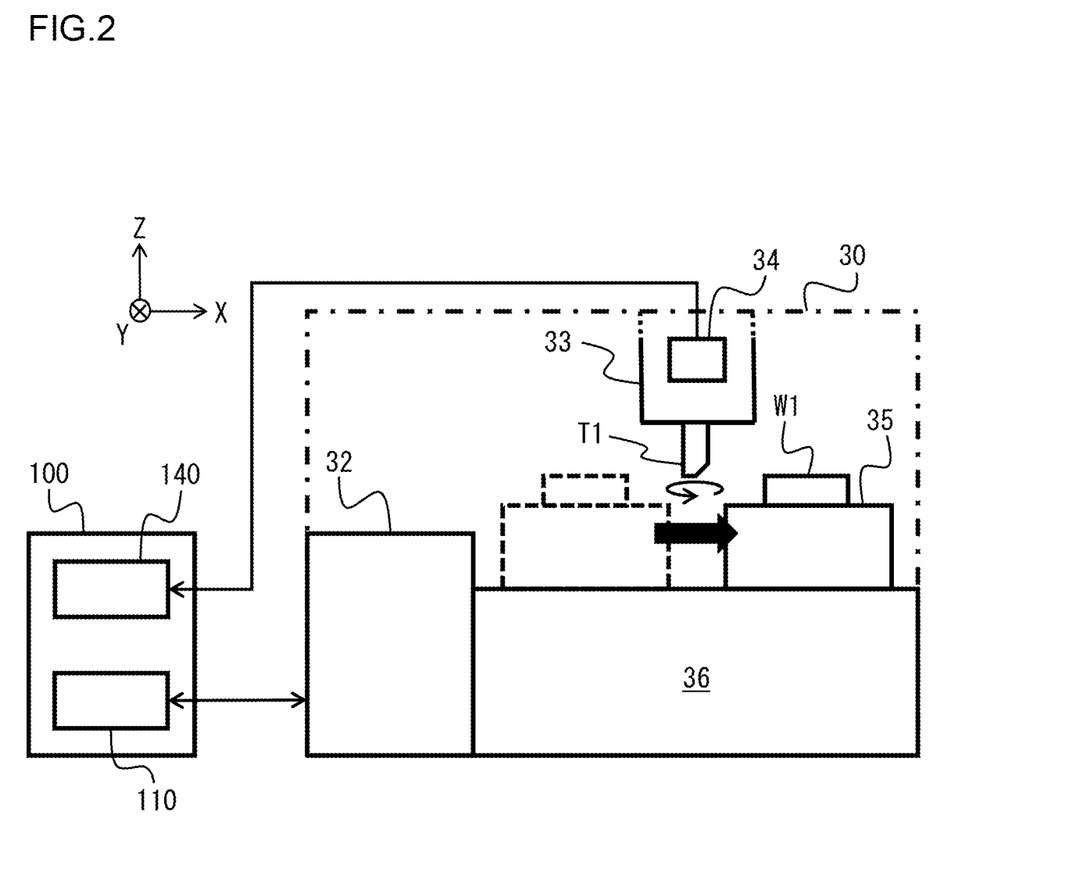
FIG. 2 is a block diagram showing an example of a connection state between the control object and the numerical control device shown in FIG. 1.

FIG. 1 is a block diagram showing a relation between a numerical control device having a function of changing a set parameter for controlling a control object at a predetermined timing and its peripheral devices according to a first embodiment that is a representative embodiment of the invention. In addition, FIG. 2 is a block diagram showing an example of a connection state between the control object and the numerical control device shown in FIG. 1.

As shown in FIG. 1, a numerical control device 100 according to the first embodiment includes as an example a main control unit 110 that outputs various commands for a control object 30 (e.g., a device whose execution of operation is controlled by numerical control of a machine tool or others), a memory 120 that stores various data including set parameters, such as position, processing conditions and others, a parameter input unit 130 that inputs a changed set parameter that is changed by overwriting a set parameter stored in the memory 120, and a parameter change command unit 140 that outputs an update command for changing the above-mentioned set parameter into a changed set parameter.

The numerical control device 100 is connected to a control unit 32 of the control object 30 or an external storage device 10 by, such as, a cable or via a communication line so that they can communicate with each other. The numerical control device 100 issues various control commands to the control object 30, and also receives detection signals from sensors 34 mounted on the control object 30.

In this specification, the term "set parameter" includes a setting item required for controlling the control object 30 and a numerical value and others therefor. For example, the parameter includes a coordinate system and its position data of a component of the control object 30 or, in a case where the control object 30 is a machine tool or similar that processes a workpiece, a processing condition or others which is set during processing. The "set parameter" is stored at all times or saved by overwriting an existing parameter in the memory 120, and combined with the control program to thereby create a control command for the control object 30.

The external storage device 10 stores beforehand a processing program in a predetermined storage area by way of example, so as to perform transmission and reception of the control program to and from the numerical control device 100. FIG. 1 shows the external storage device 10 as a structure independent of the numerical control device 100, but another aspect that incorporates the external storage device into the numerical control device 100 may be employed.

The input device 20 is an interface that allows an operator of the numerical control device 100 to turn an operation on and off, and manually input various data or set parameters. The input device 20 may be a keyboard, an input unit, such as pendant, joystick or touch panel, for instance. Furthermore, the input device 20 is connected to the parameter input unit 130 of the numerical control device 100 so that the input data, set parameters and others are temporarily stored in the parameter input unit 130.

The control object 30 is configured, as shown in FIG. 2, as processing equipment for performing a predetermined process, such as cutting, on a workpiece W1 by means of a working tool T1, by way of example. In addition to that the control object 30 includes as an example a control unit 32 that receives a control command from the numerical control device 100 to perform control of whole components of the control object 30, a tool drive unit 33 that has the working tool T1 attached thereto and moves the tool relative to the workpiece W1, various sensors 34 attached to the tool drive unit 33, a transport mechanism 35 to which the workpiece W1 is attached to be transported, and a main body unit 36 that supports the transport mechanism 35. In this illustrative embodiment, each sensor 34 includes, for instance, a position sensor for detecting a position of the working tool T1 and/or a rotational sensor for detecting a rotational speed of the working tool T1, or a load sensor or similar for detecting a load exerted on the working tool T1.

The main control unit 110 of the numerical control device 100 is configured, as shown in FIG. 1, as means for issuing various commands to the control object 30, and reads a part of the control program successively from the external storage device 10. The main control unit 110 includes a function of combining the control program thus read with the set parameters stored in the memory 120 to create a control command and send it to the control unit 32, a function of receiving detection signals from the various sensors 34 provided to the control object 30 and revising the control command according to detection values of the detection signals, and a function of transferring the received detection values to the parameter change command unit 140, which will be described later. In addition to that, the main control unit 110 may also include a function of adding or revising/modifying the control program stored in the external storage device 10, if needed.

The parameter input unit 130 is configured to receive various data and set parameters input from the input device 20 and store them temporarily in an embedded buffer, not shown. Furthermore, the parameter input unit 130 has a function of sending a changed set parameter temporarily stored to the memory 120 upon receipt of an update command from the after-mentioned parameter change command unit 140, so as to overwrite and update a set parameter.

The parameter change command unit 140 has a function of determining a timing of changing the set parameter into the changed set parameter based on the detection values received from the various sensors of the control object 30 via the main control unit 110 and issuing an update command to the parameter input unit 130. Furthermore, as an example, the parameter change command unit 140 is configured to include a determination data selecting section 142 that selects determination data for determining the timing of changing a set parameter according to a target set parameter, a data acquiring section 144 that acquires a detection value of the selected determination data in real time, and a determining section 146 that creates an update command based on the detection value acquired by the data acquiring section 144.

The determination data selecting section 142 selects determination data for determining a timing of changing according to the variety of a set parameter to be changed or the like. For example, in a case where the set parameter to be changed is "cutting stroke of the working tool T1", the number of revolutions of a motor of the tool drive unit 33 for controlling the movement of the working tool T1 can be applied as determination data. In this case, a correspondence relation between the set parameter and the determination data may be stored beforehand as a correspondence table in the external storage unit 10 or others, or the variety of the determination data may be input together with a changed set parameter from the input device 20.

The data acquiring section 144 acquires the determination data selected by the determination data selecting section 142 in real time. More specifically, by way of example, the data acquiring section 144 acquires a detection value corresponding to the determination data in real time from each sensor 34 of the control object 30 through the main control unit 110, so as to share the detection value as time-series waveform data with the determining section 146.

The determining section 146 monitors real-time waveform data of the determination data acquired by the data acquiring section 144 to determine whether or not the concerned determination data has measured up a predetermined condition that can change the set parameter (or whether or not the determination data is in a state defined by the predetermined condition). In this determination, when it is determined that the determination data has measured up the predetermined condition, the parameter change command unit 140 outputs a change command signal to the parameter input unit 130.

For example, in a case where the set parameter to be changed is "cutting stroke of the working tool T1" and the determination data is about "number of revolutions of the motor of the tool drive unit 33", the determining section 146 can adopt, as a predetermined condition that will be an index for making determination, a state where the number of revolutions becomes zero (i.e., when motor drive stops). Furthermore, the predetermined condition may be added to the above-mentioned correspondence table for the set parameter and the determination data and then stored beforehand, or may be input together with the variety of the determination data from the input device 20.

Figure 3:
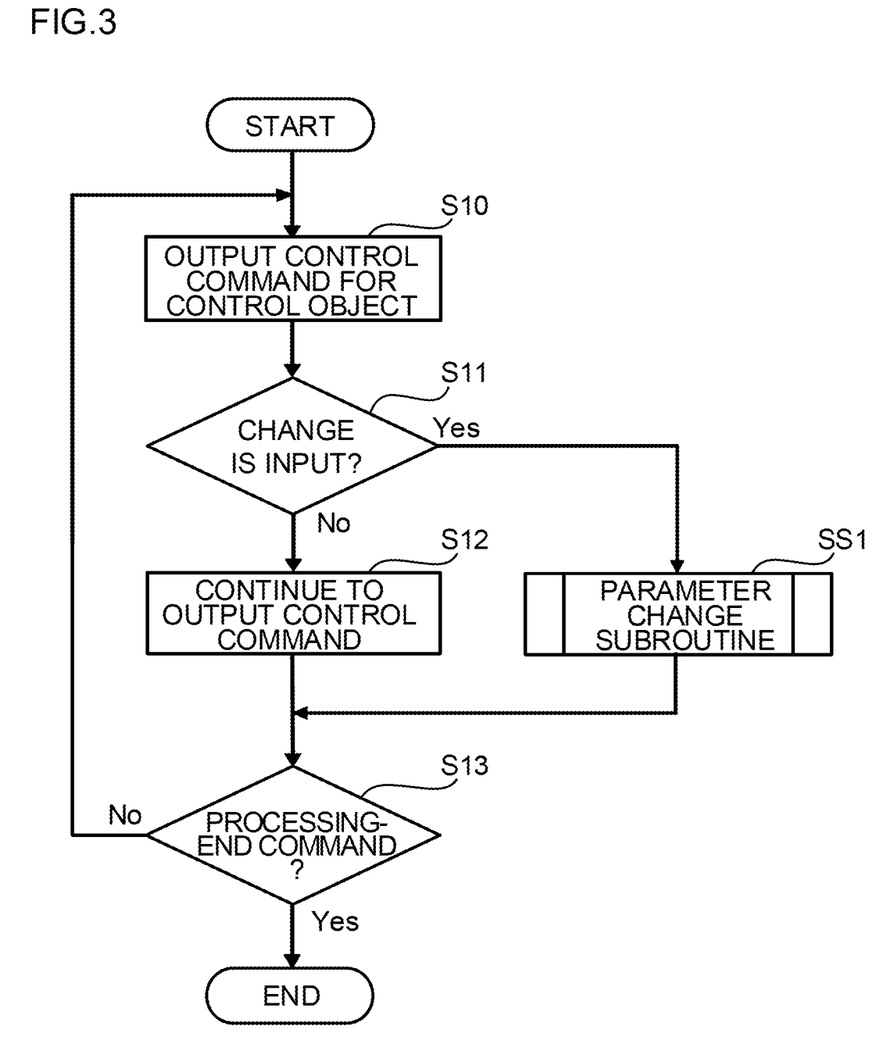
FIG. 3 is a flowchart showing an outline of a method for changing the set parameter for the numerical control device according to the first embodiment.
Figure 4:
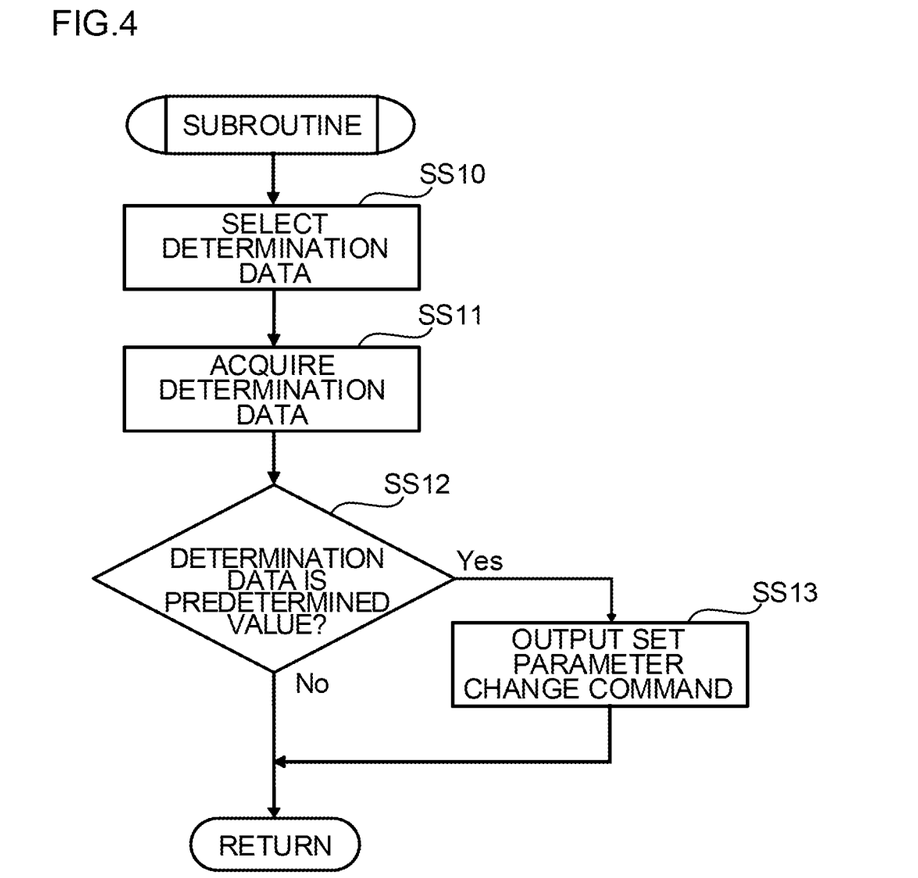
FIG. 4 is a flowchart showing an outline of a subroutine for changing the parameter shown in FIG. 3.

FIG. 3 is a flowchart showing an outline of a method for changing a set parameter for the numerical control device according to the first embodiment. In addition, FIG. 4 is a flowchart showing an outline of a subroutine for changing the parameter shown in FIG. 3. As premises for implementing the flowcharts shown in FIGS. 3 and 4, the main control unit 110 performs control in response to a normal control command for the control object 30 by the control program, and thus, if there is no specific command for changing a set parameter, the control will be continued in response to the normal control command.

In the method for changing a set parameter for the numerical control device 100 according to the first embodiment, as shown in FIG. 3, the main control unit 110 of the numerical control device 100 executes the control in response to a control command by the control program (Step S10). The numerical control device 100 in turn determines whether or not a change reservation for a changed set parameter is input in the parameter input unit 130 from the input device 20 (Step S11). The determination operation in Step S11 is performed every control clock of the main control unit 110, for instance.

In Step S11, if it is determined that the change reservation is not input, the main control unit 110 continues the control according to the control command executed in Step S10 (Step S12), and then the main control unit 110 determines whether the next control command is a processing-end command (Step S13). On the other hand, if it is determined that the changed set parameter as well as the change reservation are input in Step S11, the parameter change command unit 140 performs a parameter change subroutine SS1, and after the completion of the parameter change subroutine SS1, the procedure moves to Step S13 for determination.

Then, if it is determined that the next control command is a processing-end command in Step S13, the main control unit 110 issues the processing-end command to the control object 30 to end the control. On the other hand, if it is determined that the next control command is not the processing-end command in Step S13, the procedure goes back to Step S10 to execute the control according to the control command by the control program.

In the parameter change subroutine SS1 shown in FIG. 3, as shown in FIG. 4, the determination data selecting section 142 of the parameter change command unit 140 selects determination data for determining a timing of changing according to a variety of a set parameter to be changed (SS10). In response to this, the data acquiring section 144 acquires in real time a detection value of the determination data selected in Step SS10 (SS11).

Then, the determining section 146 determines whether or not the detection value acquired in Step SS11 has reached a predetermined value (i.e., the detection value has measured up a predetermined condition) (Step SS12). If it is determined that the determination data has not reached the predetermined value in Step SS12, the procedure returns to a main routine upon just exiting the subroutine SS1. Thus, although the change reservation for the set parameter has been made, it is determined that the parameter change is not yet possible, and thus the control according to the normal control command is continued.

On the other hand, if it is determined that the determination data has reached the predetermined value in Step SS12, the parameter change command unit 140 outputs a change command signal to the parameter input unit 130 (Step SS13). Then, the subroutine SS1 is completed to return to the main routine. Thus, the set parameter stored in the memory 120 is overwritten with a changed set parameter temporarily stored in the parameter input unit 130 and then stored, and the control according to the normal control command is continued.

Next, by referring to FIGS. 5 to 7, variations of the numerical control device and the method for changing a set parameter therefor according to the first embodiment will be described.

Figure 5:
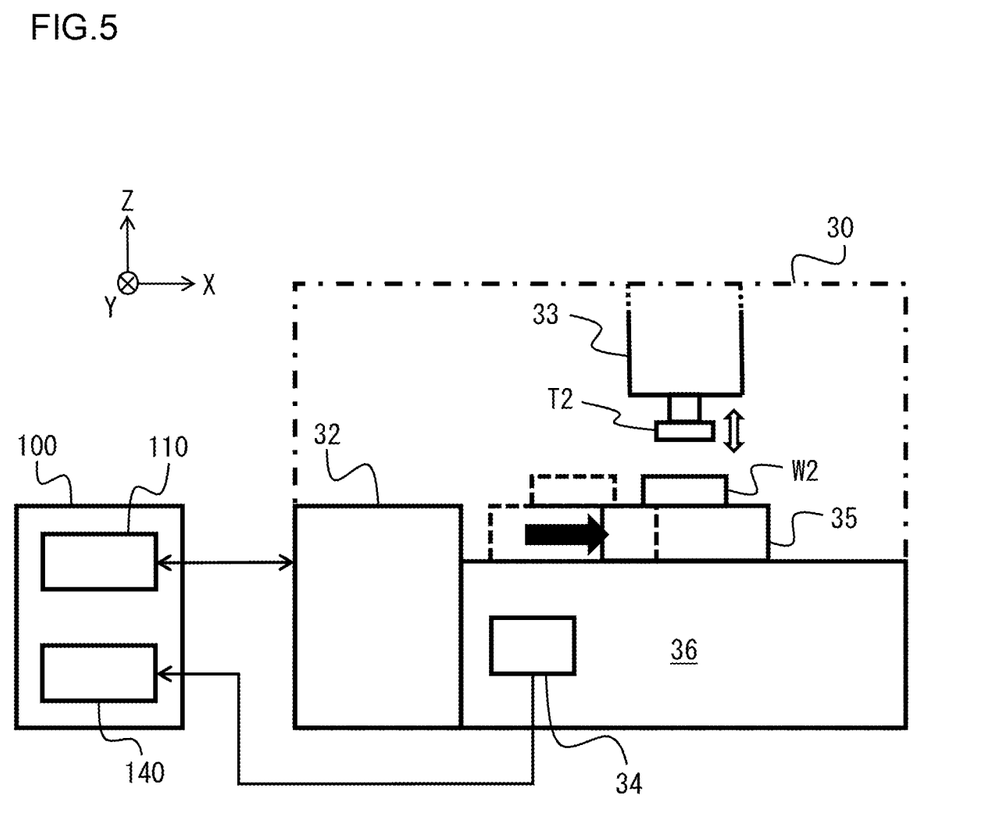
FIG. 5 is a block diagram showing an example of a connection state between the control object and the numerical control device according to a first variation of the first embodiment.

FIG. 5 is a block diagram showing an example of a connection state between the control object and the numerical control device according to a first variation of the first embodiment. In the specific example shown in FIG. 2, processing equipment for performing a predetermined process, such as cutting, on the workpiece W1 by means of the working tool T1 is illustrated as the control object 30. However, as the control object 30 in the first variation, an affixing tool T2 is configured as a packing device for affixing a label on an upper surface of a workpiece W2 to be transported.

In FIG. 5, the control object 30 includes, by way of example, a control unit 32 that receives a control command from the numerical control device 100 to execute control of the whole components of the control object 30, a tool drive unit 33 that has the affixing tool T2 attached thereto and moves it relative to the workpiece W2, a transport mechanism 35 to which the workpiece W2 is attached to be transported, a main body unit 36 that supports the transport mechanism 35, and various sensors 34 attached to the main body unit 36. In this illustrative embodiment, the sensors 34 include, for instance, a position sensor for detecting a position of the workpiece W2, and a speed sensor for detecting a transportation speed of the transport mechanism 35.

In addition to that, in the first variation, if a set parameter to be changed is "transportation stroke of the workpiece W2", a transportation speed of the transport mechanism 35 for transporting the workpiece W2 can be applied as determination data. In this case, for example, it can be adopted as a predetermined condition that will be an index for a parameter change command unit 140 to determine whether to send out a change command signal that a case where the transportation speed becomes zero (i.e., the drive of a transportation motor is stopped) if the above-mentioned determination data is "transportation speed of the transport mechanism 35". In this way, the numerical control device and the method for changing a set parameter therefor according to the invention can be applied to an arbitrary control object that perform automatic control by numerical control.

Figure 6:
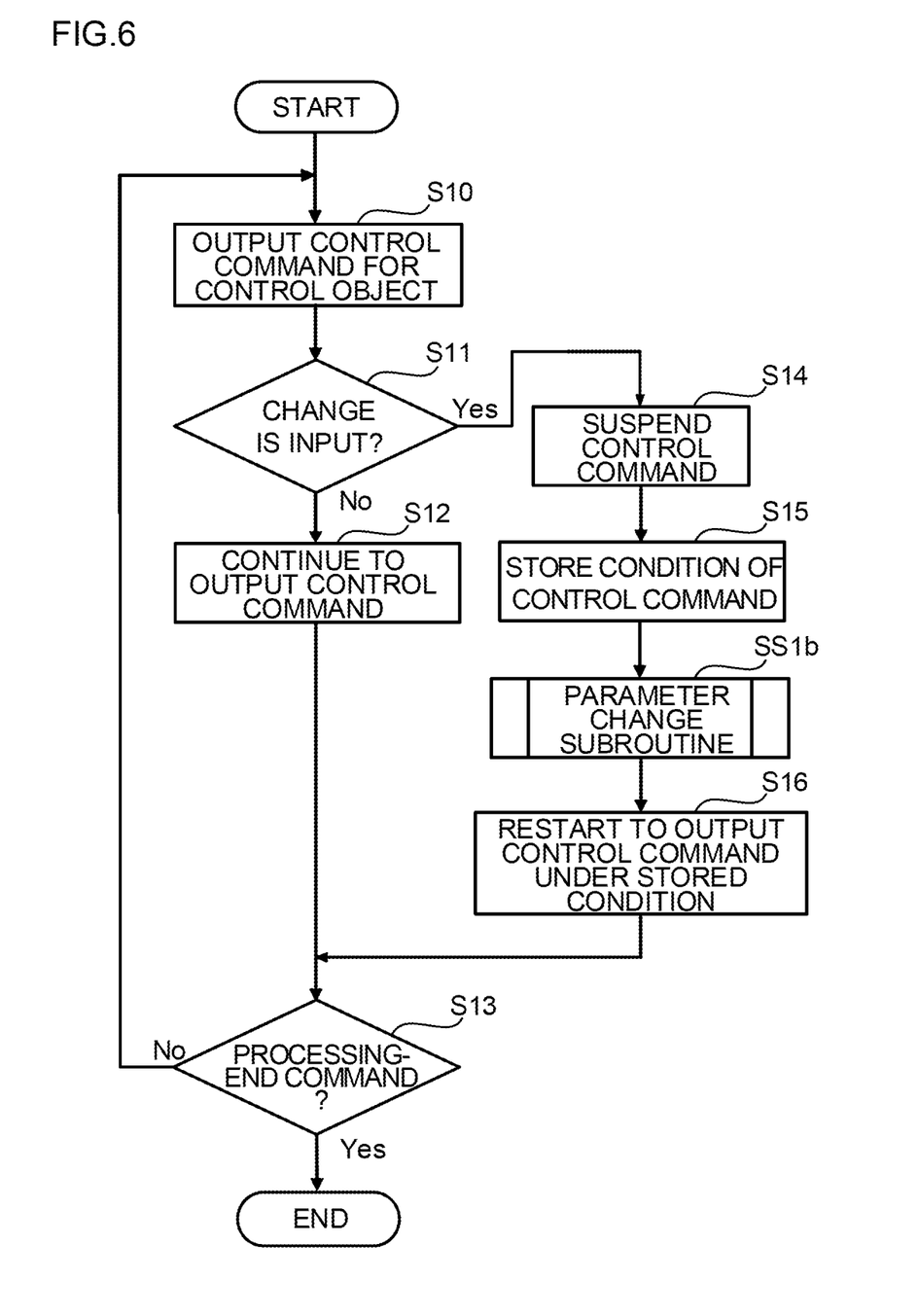
FIG. 6 is a flowchart showing an outline of a method for changing a set parameter for a numerical control device according to a second variation of the first embodiment.

FIG. 6 is a flowchart showing an outline of the method for changing a set parameter for the numerical control device according to a second variation of the first embodiment. Furthermore, FIG. 7 is a flowchart showing an outline of a subroutine for changing the parameter shown in FIG. 6. In here, as premises for implementing the flowcharts shown in FIGS. 6 and 7, the main control unit 110 also executes control in response to a normal control command for the control object 30 by a control program, and thus, if there is no specific command for changing a set parameter, the control will be continued according to the normal control command.

In the method for changing the set parameter according to the second variation, as with the case in FIG. 3, the main control unit 110 of the numerical control device 100 executes the control according to the control command of the control program (Step S10). Then, the numerical control device 100 determines whether or not a change reservation for a changed set parameter is input in the parameter input unit 130 from the input device 20 (Step S11).

In Step S11, if it is determined that the change reservation is not input, the main control unit 110 continues the control according to the control command executed in Step S10 (Step S12), and then the main control unit 110 determines whether the next control command is a processing-end command (Step S13). On the other hand, if it is determined that the changed set parameter as well as the change reservation are input in Step S11, the numerical control device 100 sends out a suspension signal for suspending execution of the control command for the control object 30 (Step S14). In this case, the suspension signal may include a control command for retracting the working tool T1 so as to prevent damage to the workpiece W1.

Then, the main control unit 110 temporarily stores a control condition (e.g., operation parameter) of the control command that was being executed until the suspension command was issued (Step S15), and the procedure moves to a parameter change subroutine SS1*b*. In this case, the control condition of the control command at the time of suspension may be temporarily stored in the memory 120 instead of the main control unit 110.

After the parameter change command unit 140 executes the parameter change subroutine SS1*b*, the main control unit 110 read the control condition temporarily stored in Step S15 to restart the control according to the control command under the concerned control condition (Step S16). Consequently, the control is restarted in a state where the set parameter was changed when the control operation on the control object 30 was suspended. The main control unit 110 in turn moves to the determination process in Step S13.

Then, if it is determined that the next control command is a processing-end command in Step S13, the main control unit 110 issues the processing-end command to the control object 30 to end the control. On the other hand, if it is determined that the next control command is not the processing-end command in Step S13, the procedure goes back to Step S10 to execute the control according to the control command by the control program.

Figure 7:
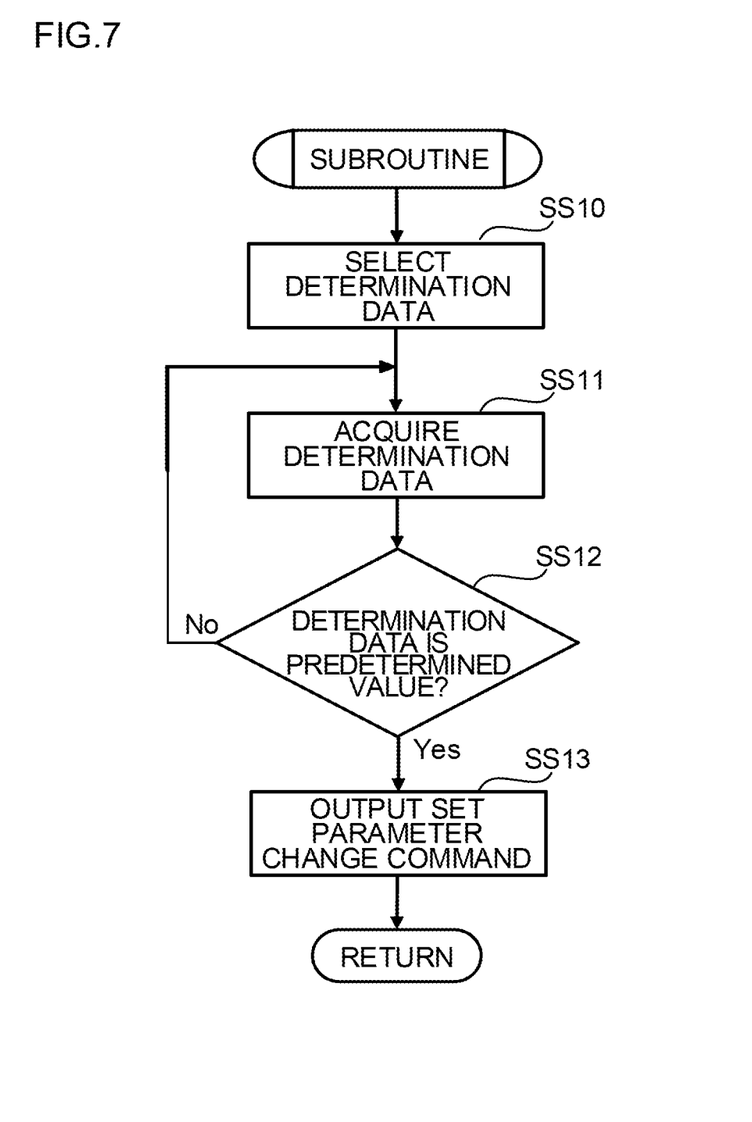
FIG. 7 is a flowchart showing an outline of a subroutine for changing the parameter shown in FIG. 6.

The parameter change subroutine SS1*b* is executed by the parameter change command unit 140 of the numerical control device 100 according to the flowchart shown in FIG. 7, as with the case in FIG. 3. In the parameter change subroutine SS1*b*, as with the flowchart in FIG. 4, the determination data selecting section 142 firstly selects determination data for determining a timing of changing a set parameter to be changed according to its variety or the like (SS10). In response to this, the data acquiring section 144 acquires in real time a detection value of the determination data selected in Step SS10 (SS11).

Then, the determining section 146 determines whether or not the detection value acquired in Step SS11 has reached a predetermined value (i.e., the detection value has measured up a predetermined condition) (Step SS12). If it is determined that the determination data has not reached the predetermined value in Step SS12, the procedure goes back to the subroutine SS11 in the second variation to repeat the acquisition and the determination of the detection value of the determination data.

On the other hand, if it is determined that the determination data has reached the predetermined value in Step SS12, the parameter change command unit 140 outputs a change command signal to the parameter input unit 130 (Step SS13), and the subroutine SS1 is ended to return to the main routine. Thus, the changed set parameter temporarily stored in the parameter input unit 130 is written over the set parameter stored in the memory 120, and the control according to the normal control command is continued.

According to the subroutine SS1b, the procedure will return to the main routine after the set parameter is changed. Since the subroutine is executed by combining with the main routine shown in FIG. 6, according to the second variation, the control command for the control object 30 is suspended when the set parameter is changed, and after changing the set parameter, the control can be restarted according to the suspended control command.

With the above configuration, the numerical control device and the method for changing a set parameter therefor according to the first embodiment selects determination data for determining a timing of changing a set parameter according to the set parameter when an update command is output for changing the set parameter into a changed set parameter, acquires a detection value of the selected determination data in real time, and creates an update command based on the acquired detection value, thereby enabling to change the set parameter at a predetermined timing even during a control operation. As a consequence, time taken for changing the set parameter can be reduced.

Second Embodiment

Figure 8:
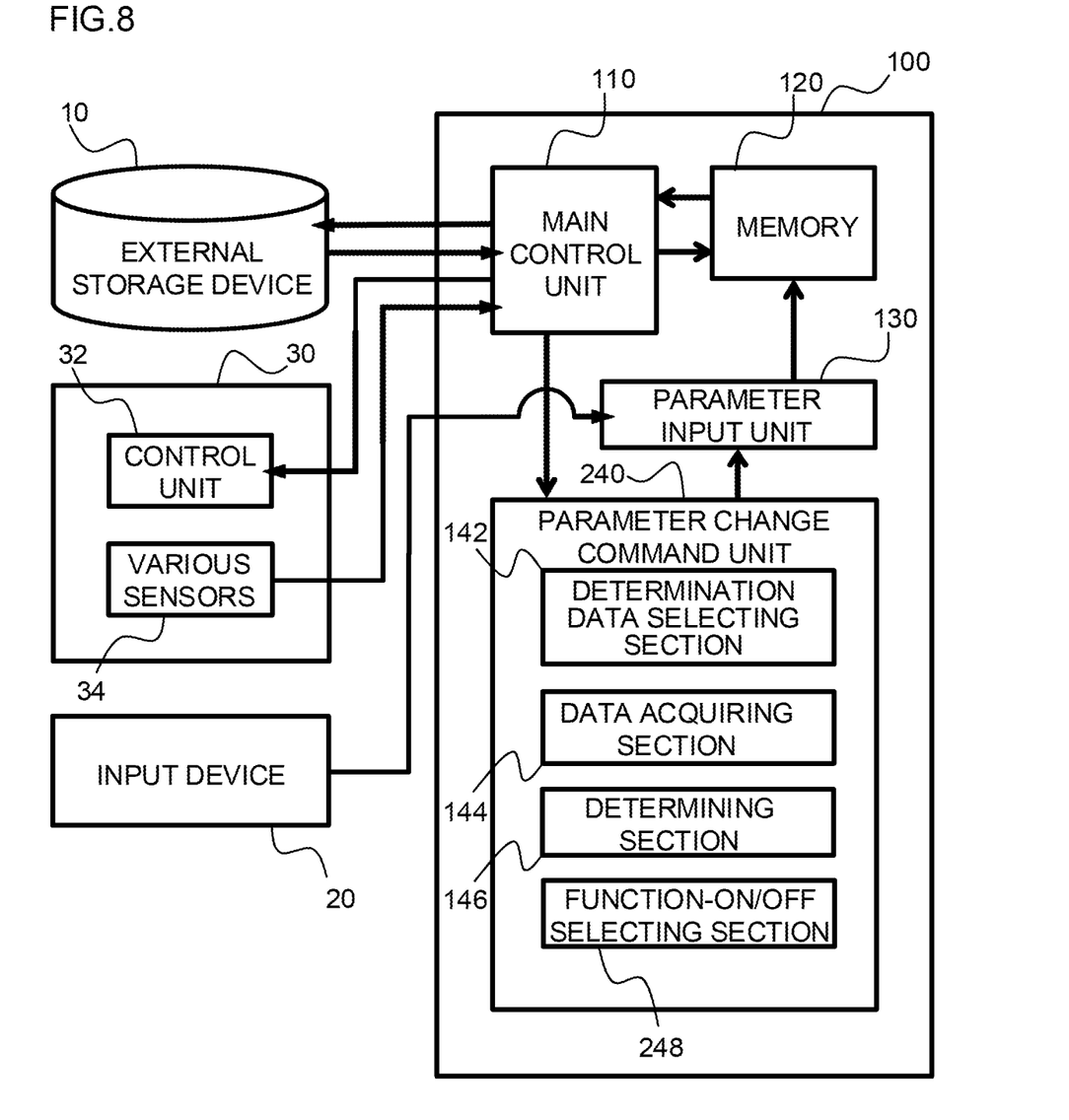
FIG. 8 is a block diagram showing a relation between a numerical control device having a function of changing a set parameter for controlling a control object at a predetermined timing and its peripheral devices according to a second embodiment of the present invention.

FIG. 8 is a block diagram showing a relation between a numerical control device having a function of changing a set parameter for controlling a control object at a predetermined timing and its peripheral devices according to a second embodiment of the present invention. In the second embodiment, components and others that can employ configurations similar to or in common with those shown in the block diagrams and the flowcharts in FIGS. 1 to 7 are indicated with the same reference numerals used in FIGS. 1 to 7, and a description about them will not be repeated.

As shown in FIG. 8, a numerical control device 100 according to the second embodiment includes a main control unit 110, a memory 120, a parameter input unit 130 and a parameter change command unit 240. In the second embodiment, the parameter change command unit 240 is configured to include, by way of example, a function-ON/OFF selecting section 248 for selecting whether to use functions of the parameter change command unit 240 in addition to a determination data selecting section 142, a data acquiring section 144 and a determining section 146.

The function-ON/OFF selecting section 248 is means for selecting whether to implement an automatic determination about the timing of changing the set parameter by the parameter change command unit 240, and is configured to allow the parameter change command unit 240 to output an update command to the parameter input unit 130 only when the function-ON/OFF selecting section 248 is in an ON state.

ON and OFF states of the function-ON/OFF selecting section 248 can be chosen arbitrarily by an operator who uses the numerical control device 100 of the invention. In this connection, the selection of the ON/OFF state may be implemented by providing a separate switch, not shown, to the numerical control device 100 or by inputting a command directly from an input device 20 by adding a function of inputting an ON/OFF command to the input device 20.

Figure 9:
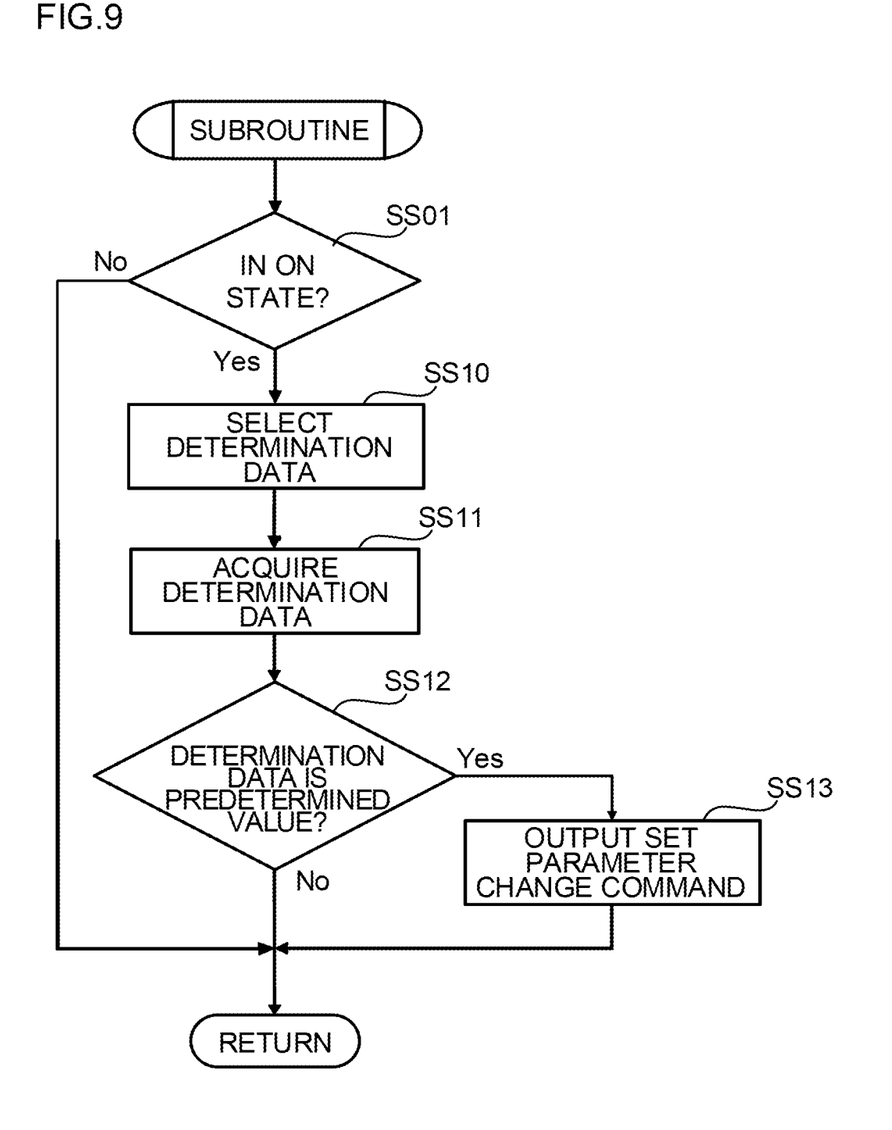
FIG. 9 is a flowchart showing an outline of a subroutine for changing a parameter in a method for changing the set parameter for the numerical control device according to the second embodiment.

FIG. 9 is a flowchart showing an outline of a parameter changing subroutine in the method for changing a set parameter for the numerical control device according to the second embodiment. The parameter changing subroutine (indicated by reference numeral "SS2") in the second embodiment firstly determines whether the function-ON/OFF selecting section 248 is in an ON state or not (SS01).

In Step SS01, if it is determined that the function-ON/OFF selecting section 248 is not in the ON state (namely in an OFF state), the parameter change command unit 240 does not execute the parameter change subroutine SS2 any further and returns to a main routine. On the other hand, if it is determined that the function-ON/OFF selecting section 248 is in the ON state, the procedure moves to Step SS10 to select determination data for determining a timing of changing a parameter according to, such as, the variety of a set parameter to be changed.

Step SS10 and subsequent steps are the same as those illustrated in FIG. 4, and thus these steps will not be described in here. It is to be noted that, as a variation, the configurations of Step SS10 and the subsequent steps may be the same as those of the parameter change subroutine SS1b illustrated in FIG. 7.

With the above configuration, the numerical control device and the method for changing set parameter therefor according to the second embodiment can select ON and OFF of the function of automatically changing the set parameter in addition to provide effects described in the first embodiment, thereby reducing a burden of constantly monitoring the determination data and consequently reducing burdens of computation and processing in the numerical control device.

In the above description about the second embodiment, the ON and OFF states of the function-ON/OFF selecting section 248 can be decided by the direct input by the operator. Alternatively, the ON and OFF states may be decided based on various detection values acquired from the sensors 34 of the control object 30 via the main control unit 110. Furthermore, the illustrative embodiment describes that the parameter change command unit 240 determines whether to execute the parameter change subroutine SS2 in the concerned subroutine. Alternatively, it is possible to change such that the main control unit 110 makes the determination during the main routine.

Furthermore, the present invention is not limited to the above-described embodiments and may be modified in various ways based on the gist of the invention. In the present invention, any constituent elements in the embodiments can be varied within the scope of the invention, or any constituent elements in the embodiments can be omitted.

REFERENCE SIGNS LIST

10 External Storage Device
20 Input Device
30 Control Object
32 Control Unit
34 Various Sensors
100 Numerical control device
110 Main Control Unit
120 Memory
130 Parameter Input Unit
140 Parameter Change Command Unit
142 Determination Data Selecting Section
144 Data Acquiring Section
146 Determining Section
240 Parameter Change Command Unit
248 Function-ON/OFF Selecting Section

The invention claimed is:
1. A numerical control device having a function of changing a set parameter for controlling a control object at a predetermined timing, comprising:

a main control unit that outputs various commands to the control object;

a memory that stores various data including the set parameter;

a parameter input unit that inputs a changed set parameter that is changed by overwriting the set parameter stored in the memory; and a parameter change command unit that outputs an update command for changing the set parameter into the changed set parameter, wherein the parameter change command unit comprises:

a determination data selecting section that selects determination data for determining the predetermined timing based on the set parameter;

a data acquiring section that acquires a detection value of the determination data in real time; and a determining section that creates the update command based on the detection value acquired by the data acquiring section.

2. The numerical control device according to claim 1, wherein the determination data is selected together with the changed set parameter in response to an input from the parameter input unit.

3. The numerical control device according to claim 1, wherein the main control unit suspends outputting the various commands when the update command is output during outputting the various commands, and restarts outputting the various commands after changing the changed set parameter.

4. The numerical control device according to claim 1, wherein the parameter change command unit further comprises a function-ON/OFF selecting section, and when the function-ON/OFF selecting section is in an ON state, the parameter change command unit outputs the update command.

5. A method for changing a set parameter for a numerical control device for changing a set parameter for controlling a control object at a predetermined timing, performing when outputting various command for the control object:

a step of inputting a changed set parameter that is changed by overwriting the set parameter stored in a memory for storing various data including the set parameter; and a step of outputting an update command for changing the set parameter into the changed set parameter, the step of outputting the update command comprises:

a step of selecting determination data for determining the predetermined timing based on the set parameter;

a step of acquiring a detection value of the determination data in real time; and a step of creating the update command based on the acquired detection value.

6. The method for changing the set parameter for the numerical control device according to claim 5, wherein the determination data is selected by inputting the determination data together with the changed set parameter.

7. The method for changing the set parameter for the numerical control device according to claim 5, wherein the outputting of the various commands is suspended when the update command is output during outputting the various commands, and the outputting of the various commands is restarted after the changed set parameter is changed.

8. The method for changing the set parameter for the numerical control device according to claim 5, wherein the numerical control device is configured such that ON and OFF of the step of outputting the update command can be selected.

* * * * *